June 24, 1958  G. H. RODGERS  2,840,804
MULTIPLE INDICATOR AND WARNING LIGHT SWITCHING SYSTEM
Filed Dec. 11, 1956

INVENTOR.
GEORGE H. RODGERS
BY
-ATTORNEY-

United States Patent Office 2,840,804
Patented June 24, 1958

2,840,804

MULTIPLE INDICATOR AND WARNING LIGHT SWITCHING SYSTEM

George H. Rodgers, Elsinore, Calif., assignor to Marco Industries Company, Anaheim, Calif.

Application December 11, 1956, Serial No. 627,673

6 Claims. (Cl. 340—213)

This invention relates to warning systems of the multiple indicator or annunciator type adapted to indicate separately the conditions existing in any number of units of mechanism. For example, the invention is applicable to an aircraft having various mechanisms such as landing gear retractors, flap actuators, and various other actuators, and is useful in indicating conditions of operation and position of such actuators as well as conditions existing in the engines, fuel tanks, and other functioning mechanisms of the airplane. The invention is especially applicable to a warning or annunciator system for a complex machine requiring a large number of indicators, and has as a general object to provide an electrical indicator system which will separately indicate various conditions existing in any number of operative mechanisms, with particular adaptability for controlling an unlimited number of indicators.

More particularly, the invention aims to provide a multiple indicator system including a plurality of indicators, each adapted to indicate the condition of a corresponding unit of mechanism and to hold such indication until any faulty, unwanted or abnormal condition is corrected; including an alarm device adapted to call the attention of an operator to each abnormal condition as it occurs; and including means for promptly resetting the alarm device while the indicator continues to hold its indication, in order that the alarm device may function to call attention to any subsequent occurrence of failure or abnormal condition through another of the indicators.

A further object is to provide such a multiple indicator system wherein means for testing the respective indicators to ascertain whether they are in proper operating condition, is provided. A still further object is to provide, in such a system, a means for mass testing all of the indicators through a single test switch.

Another object is to provide such a multiple indicator system, wherein resetting may be effected by pushing the warning lamp inwardly in its socket.

A still further object is to provide such a multiple indicator system wherein, if desired, the individual indicators may be of a type that can be individually tested by pressing inwardly on the respective indicators, although this is not an essential feature of the invention.

Other objects and advantages will become apparent in the ensuing specifications and drawings in which.

GENERAL DESCRIPTION OF SYSTEM

Figure 1:
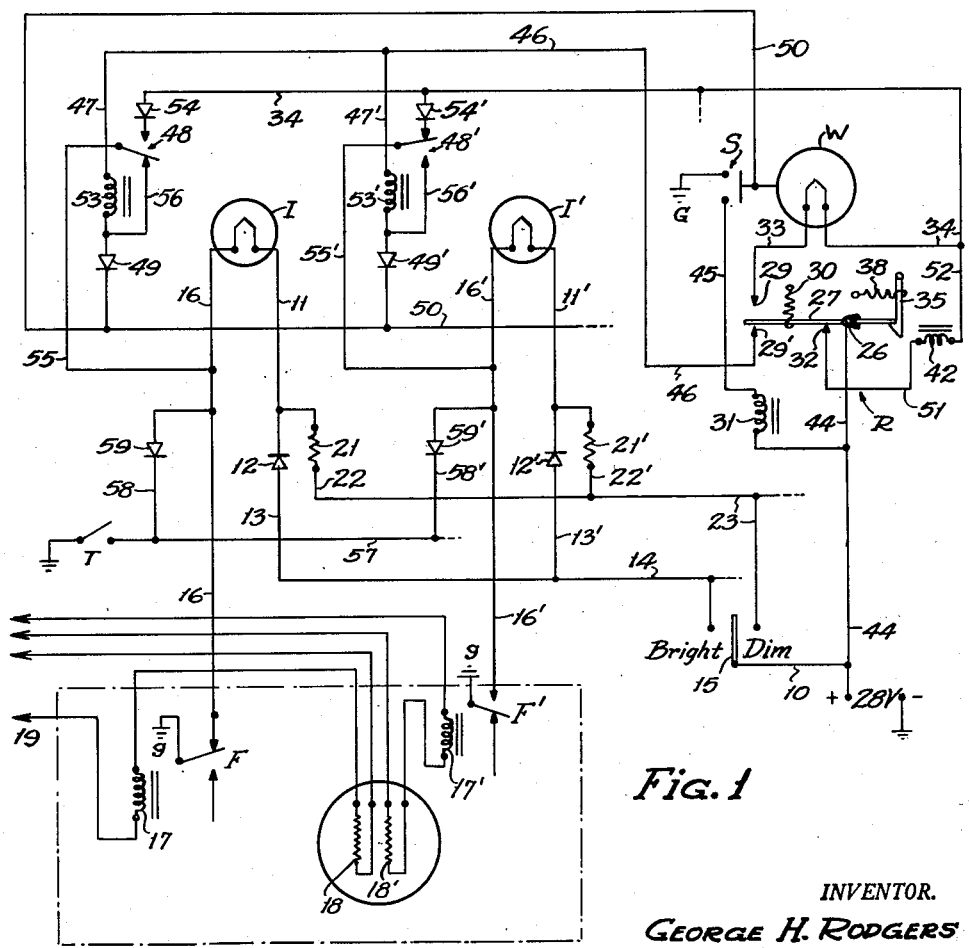
Fig. 1 is a schematic view of a multiple indicator system embodying the invention.

Referring now to the drawing in detail, I have shown, in Fig. 1, as an example of a system embodying the invention, a multiple indicator system embodying in general a plurality of individual indicators I, I' etc.; and a series of indicator actuator circuits including a common trunk line 10 from a source of electric current such as 28 volt direct current (indicated at 28V) and controlled by respective fault switches F, F', etc., whereby, upon the occurrence of a fault or other abnormal condition in any one of a plurality of mechanisms (e. g. flap actuators, landing gear actuators, or mast heater or Pitot heater, etc. in an aircraft) an individual indication of the respective troublesome condition is given on a respective indicator I, I' etc. The system further includes a warning light W which is arranged to be actuated simultaneously with the actuation of any one of the individual indicators I etc. through a holding relay R; together with a reset switch S which is manually operable to reset the relay R and thereby remove the warning indication from warning device W.

Indicator actuator circuits

The indicators I etc., may be of a type such as that shown in the application of Charles W. Noyes, S. N. 544,299 for Multiple Unit Annunciator with Press-to-Test Features, or may be plain block type indicators as shown in Patent No. 2,745,094, issued May 8, 1956, in the name of Frank A. Harrington et al. In such an indicator light, one side of the filament is connected through a branch conductor 11 or 11', etc., a one-way conductive diode 12 or 12' etc., a branch lead 13 or 13' etc., and a common lead 14 to a contact on one side of a double throw selector switch 15, through which it is connected to the source 28V by trunk line 10. The other side of each indicator lamp filament is connected by a control connection (conductor 16 or 16' etc.) to a respective fault switch F or F' etc., which, when closed, completes an indicator actuator circuit to ground indicated at g.

The fault switches F, F' etc., may be in the form of relays each having an energizing coil 17 controlled in accordance with the condition of the apparatus to be indicated, which, in the example shown, consists in a mast heater 18, a Pitot heater 18' etc., directly controlled by a suitable control such as the master switch indicated at 19. The relays F, F' may be arranged to open when the heaters are energized, and to be self closing when the heaters are deenergized, so as to indicate the condition shown on the annunciator panel (e. g. "mast heater off," "Pitot heater off," etc.).

The circuits 11, 12, 13; 11', 12', 13' etc., provide for full power, bright light actuation of indicators I, I' etc., when the selector switch 15 is shifted to "bright" position. In parallel with these circuits are alternate indicator actuator circuits each including a resistor 21 or 21' etc., a branch lead 22 or 22' etc. and a common lead 23 extending to an alternative contact in switch 15, for dim actuation of the indicators with the current reduced by the resistors 21, 21' etc.

The diodes 12, 12' in the bright circuits provide for one-way flow of current in these circuits, in a direction such as to supply full current to any indicator that is actuated by the closing of its fault switch, and to block any reverse flow in line 13 or 13' etc., in a manner to prevent the common lead 14 becoming a shunt connection between resistors 21, 21' etc. such as to permit parallel flow through several resistors to a single indicator for which the fault switch has been closed. In the absence of diodes 12, 12' etc., for example, if the fault switch F for indicator I were to be closed, with the selector switch 15 closed on the "dim" contact, several parallel paths for flow of current to indicator I would be set up. In addition to the contemplated dim circuit through conductor 22 and resistor 21 it would be possible for the lamp I to be supplied with additional current through a parallel circuit including branch lead 22', resistor 21', branch lead 13', "bright" trunk line 14 and branch lead 13. With current being supplied through several resistors in parallel, it will be obvious that more than the intended amount of current, as determined by the resistance effect of a single resistor, would reach the lamp I. The unwanted circuit just referred to is blocked at the diode 12′, thus restricting current flow to the intended dim circuit through branch lead 22 and resistor 21.

*The holding relay*

Figure 2:
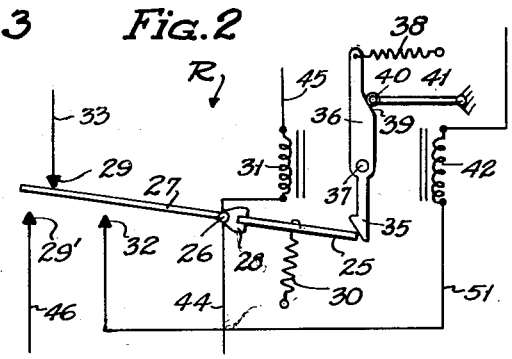
Fig. 2 is a schematic detail view of the latching relay.

The relay R is a latching relay which is shown schematically in Fig. 2. It may comprise an armature 25 pivoted at 26 on a fixed fulcrum, carrying a movable contact 27 through an insulator mounting 28, having a double throw action, with the contact 27 normally closing on a contact 29 (Fig. 2) by operation of a bias spring 30, and having an energizing coil 31 adapted to pull the armature 25 to an alternate position in which the contact 27 closes on alternate contacts 29′, 32 as shown in Fig. 1.

When closed on contact 29, the relay R establishes a connection through a conductor 33 to illuminate the warning lamp W, conductor 33 being connected to one side of the lamp filament and the other side of the filament being connected through a conductor 34 to the fault switch of an indicator I, I′ etc., that has been illuminated, as will presently be more specifically described.

When the relay R closes on contacts 29′, 32, it becomes latched in that position by a latching dog 35 on one end of a lever 36 which is pivoted at 37 and biased by a spring 38 toward the latching position. Lever 36 has a camming face arranged to be engaged by a camming element 40 on the end of an armature 41 of a solenoid 42 which, when energized, is adapted to swing the armature 41 to effect a camming action of element 40 against cam face 39 to tilt the lever 36 so as to release the armature 25 from its engagement by dog 35.

Relay R has its energizing coil 31 connected to current source 28V by a power lead 44, the energizing circuit being completed through a conductor 45 and reset switch S to ground at G. The closing of switch S thus is effective to shift the relay from its normal position shown in Fig. 2 to its latched position shown in Fig. 1.

In its latched position, relay R constitutes one connection in a reversing circuit from power lead 44 to contact 27, thence from contact 29′ through a conductor 46 and a branch conductor 47 or 47′, etc. to the energizing coil of a coupling relay 48 or 48′ etc., thence through a diode 49 or 49′, etc., a common conductor 50, and reset switch S to ground at G. This circuit is closed by resetting operation of switch S (as by pushing on lamp W) which completes the connection to ground at G by energizing coil 31 to shift relay R to the latching position, which then completes the connection to source 28V through contacts 27, 29′. The reversing circuit functions for reversing any coupling relay 48 that is connected to ground through a respective fault switch F, F′ etc., which reversing action immediately follows the latching of relay R.

A second circuit, set up (partially) when relay R is shifted to its latched position is an unlatching circuit from source 28V through conductor 44, relay contacts 27, 32, a connection 51 to solenoid 42, the common conductor 34, and a diode 54 or 54′ etc., to a contact of a respective coupling relay 48 or 48′ etc. on which the movable contact of that relay is normally closed as shown for relay 48′ in Fig. 1, but which is opened (to the position shown for relay 48) when the reset switch S is closed. (Such reversal of the coupling relay, resulting from the closing of switch S, will be held in any coupling relay—e. g. 48 that is connected to ground at g through its associated fault switch—e. g. F, being closed.) Upon a subsequent return of the coupling relay 48 or 48′ etc. to its normally closed position, the unlatching circuit is completed from the coupling relay through a connection 55 or 55′ etc. to an indicator control conductor 16 or 16′ etc., but will then be open at the respective fault switch F or F′ etc. Upon a subsequent closing of the respective fault switch, the unlatching circuit will be completed to ground at g and solenoid 42 will then be energized to actuate latch dog 35 to the release position, allowing relay R to move to its unlatched position, closing on contact 29 to illuminate warning lamp W.

Each coupling relay is a double-throw relay, having a secondary contact on which its movable contact closes when the relay is initially energized and which, through a connection 56 or 56′, etc. to the energizing coil of the respective relay, provides a self-energizing or holding circuit in parallel with the initial circuit through conductor 50, thus to hold the coupling relay in its energized position after said initial circuit is opened.

It may now be noted that any one of several illuminating circuits for warning lamps W may be established, from ground at g through a fault switch F or F′ etc., an indicator control line 16 or 16′ etc., a connection 55 or 55′ etc., a coupling relay 48 or 48′ etc.; common conductor 34, lamp W, conductor 33, relay contacts 29 and 27 and conductor 44 to source 28V. Such a circuit is set up each time an indicator I or I′ etc. is illuminated by closing of its respective fault switch. Thus the lamp W gives a warning indication each time an indicator I or I′ etc. is illuminated.

The energized position of a coupling relay 48, 48′ etc., may be regarded as its open position wherein the warning lamp illuminating circuit through conductor 34 is broken, extinguishing the lamp W.

Indicators I, I′ etc. can be mass tested by closing a master test switch T which is connected, through a common test line 57, branch test lines 58, 58′ etc., and diodes 59, 59′ etc. to control lines 16, 16′ etc. Diodes 59, 59′ function to provide one-way flow of current such as to illuminate all indicators I, I′ etc. when switch T is closed, but block reverse flow so as to prevent cross-flow between control lines 16, 16′ etc. through test line 57 when fault switch F is closed. Thus the diodes isolate the fault circuits so that each is controlled only by its individual fault switch.

Diodes 49, 49′ etc. provide for one-way flow between coupling relay ground line 50 and the respective energizing coils of the coupling relays, but prevent reverse flow so as to isolate connections 56, 56′ etc. from common conductor 50, thus preventing the occurrence of a cross circuit from the fault switch (e. g. switch F) of one relay (48) through its connection 56 to conductor 50 and thence through diode 49′ to another relay 48′.

Diodes 54 provide for one-way flow of current between fault switch control lines 16, 16′ etc. and warning lamp illuminating line 34, but block reverse flow so as to prevent cross-flow through conductor 34 from a control line 16 or 16′ of one indicator to a connection 55′ or 55 etc. of another indicator, and thence through the filament of such other indicator.

*The combined warning light and reset switch*

Figure 3:
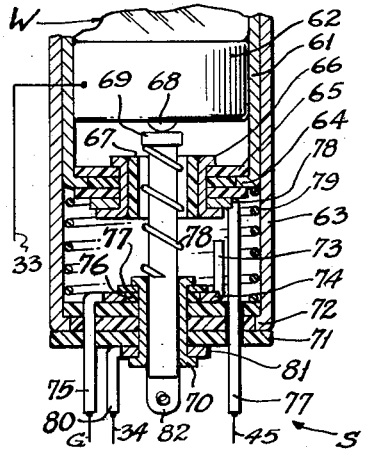
Fig. 3 is a diagrammatic view of the combination warning light and reset switch.

The warning light R and reset switch S may be combined in a single unit as shown in Fig. 3. A slidable lamp casing tube 61, providing a socket in which the base 62 of the lamp W may be mounted, is slidably received in a barrel 63 which may be provided with means (not shown) for mounting the same in an instrument panel or the like. Mounted in the flanged bottom 64 of tube 61 is a sandwich assembly of insulating washers 65 secured together by a grommet 66 extending through the center of the assembly and having a lining sleeve 67 of insulating material. The central end contact 68 of lamp W may engage the head of a contact pin 69 slidably mounted in a metal conductor sleeve 70 in the form of a grommet extending through the center of a sandwich assembly of insulator washers 71 interlocked with an end flange 72 on barrel 63, and closing the end of the barrel. The switch S includes, as one contact, the rear flange of grommet 66 and as its other contact, a finger 73 projecting axially from a ring 74 formed integrally on the inner end of a terminal 75 that extends through and is mounted in the insulator sandwich assembly 71. Ring 74 is insulated from conductor sleeve 70 by a small washer 76 received within its central opening, and is secured against assembly 71 by a washer 77, also of insulating material, washer 77 being clamped beneath the inner flange of sleeve 70. Finger 73 is formed integrally with and bent at right angles to ring 74.

A terminal 77 is formed integrally with a ring 78 which is clamped beneath the contact flange of grommet 66 and the insulator washer assembly 65. Terminal 77, of bar form (as is terminal 75) extends through registering apertures in the washers of assembly 71, with sufficient clearance to be freely slidable therein.

A coil spring 78 encircles conductor pin 69 and is engaged under compression between the head of pin 69 and the inner end of conductor sleeve 70. Spring 78 functions to maintain the pin 69 yieldingly in engagement with contact 68. A coil spring 79 may be utilized for yieldingly moving lamp tube 61 forwardly in barrel 63, being engaged under compression between the tube flange 64 and the insulator sandwich 71 as shown.

In accordance with the conventional practice, the tube 61 may have at its forward end a head (not shown) containing a lens which may be engaged by fingertip pressure to shift the tube 61 rearwardly, compressing springs 78 and 79 and causing grommet 66 to make engagement with contact 73, thus closing the switch S of which these two parts constitute the contacts.

The terminals to lamp W may include a terminal 80, having an integral ring portion 81 engaged beneath the outer flange of conductor tube 70 and insulator assembly 71, and may also include a terminal which may be in the form of a leg 82 formed integrally with sleeve 61 and extending axially from the lateral wall thereof through the assembly 71 for free sliding movement, similarly to the terminal leg 77.

Operation

In operation, the system will normally have its various switches (except relays R and 48 and switch F) standing in the positions shown in Fig. 1, relay R being in its unlatched position, coupling relays 48, 48' being in their normally closed positions as shown, for relay 48', and all lamps being extinguished. Upon closing of a fault switch (e. g. switch F) parallel circuits will be established through a control line 16 or 16' etc. (a) to a respective indicator lamp I or I' etc., connection 11 or 11' etc., and either a bright circuit (e. g. 12, 13, 14) or a corresponding dim circuit (e. g. 21, 22, 23) through selector switch 15 and trunk line 10 to source 28V; (b) from control line 16 or 16' etc. through a corresponding warning lamp illumination circuit, e. g. 55, 48, 54, 34, W, 33, 29, 27, 44, to source 28V. Thus the affected indicator lamp and the warning lamp are simultaneously illuminated, the latter serving to call attention to the former.

The operator, having noted the condition indicated, may then extinguish the lamp W while leaving the indicator lamp (e. g. lamp I) illuminated, by momentarily closing switch S, so as to reset lamp W for signaling the illumination of another indicator. Upon closing switch S, coil 31 of latching relay R will be energized, drawing its armature 25 to its latched position in which its contact 27 leaves contact 29 (thus extinguishing lamp W) and closes on contacts 29' and 32. The closing on contact 32 will close a circuit through common conductor 34, coupling relay 48 (which stands in its normally closed position) connection 55 and control line 16 to ground g at fault switch F, thus energizing relay 48 and causing it to reverse to its open position shown, in which it becomes self energizing through parallel connection 56 and line 16 to fault switch F.

In arriving at the latched position under the pull of coil 31, armature 25 will be latched by latching dog 35, under the pull of spring 38 against latch lever 36. Thus the contact 27 is held against contacts 29' and 32 until a subsequent unlatching operation releases it. The switch S may now be released, leaving the relay R in its latched position and the relay 48 in its reversed, open position, shown in Fig. 1. This is the stage of operation wherein the various switches are in their positions shown in Fig. 1. Indicator I remains energized at this stage, the fault switch F being closed. Relay 48 is held in its open position for the same reason, its holding circuit being energized through the closed fault switch F.

Upon removal of the fault condition, resulting in opening a fault switch F, the holding circuit to relay 48 will be broken, relay 48 will return to its normally closed position (corresponding to the position of relay 48') and the unlatching circuit through conductors 52, 34, 55, 16 will be established as far as fault switch F, where it will remain open. The indicator energizing circuit is now restored (reset) to a condition in which it becomes operative to again illuminate lamps I and W when fault switch F is again closed. The condition is similar to that shown for fault switch F', relay 48' and indicator I'. Indicator I' is extinguished because of the opening in the circuit at switch F'; relay 48' is in its normally closed position for the same reason; and the unlatching coil 42 of relay R is de-energized for the same reason. Upon the closing of fault switch F', indicator I' will be illuminated, and a circuit will be established from control conductor 16' through conductor 55' and the closed relay 48' to conductor 44 and thence to conductor 52, thus setting up the circuit to warning lamp W as far as contact 29 of relay R and completing the circuit through unlatching coil 42 of that relay, whereupon the relay R will be unlatched, its spring 30 will return it to its normal position closed on contact 29, and the warning lamp circuit will thereby be completed, giving the warning signal immediately after the illumination of indicator I'.

I claim:

1. In a multiple indicator system: a plurality of electrical indicators having individual indicator functions; a plurality of corresponding indicator actuator circuits including a common power lead for connecting the respective indicators in parallel to a source of current, and each including a fault switch and a control connection therefrom to a respective indicator; an electrical warning device; a circuit for actuating said device; a double throw latching relay having an unlatched position in which it establishes a connection in said actuating circuit; said relay including means for latching the same in a latched position, having a pair of contacts on which it closes in said latched position and including electromagnetic means for releasing said latching means; a circuit for energizing said relay to shift the same to said latched position; a reset switch for controlling said energizing circuit; a plurality of double-throw coupling relays, one for each of said indicators and each having a self-closing position in which it constitutes a connection in said warning device actuating circuit; an unlatching circuit for energizing said electromagnetic releasing means, including a connection through one of said pair of contacts of the latching relay and parallel connections through the self-closing positions of the respective coupling relays to the respective fault switch control connections; and a reversing circuit for each of said coupling relays, including a common connection to the other of said pair of contacts of the latching relay and a common connection to said reset switch, whereby the closing of said reset switch will operate to shift said latching relay to its latched position and to then shift the coupling relays to reversed positions; each coupling relay having a holding circuit which is closed by a connection to a respective fault switch established through its alternate contact in said reversed position, and which maintains the respective coupling relay in its reversed position until the respective fault switch is opened, whereupon the respective coupling relay will return to its self-closing position; the reversing of the respective coupling switch effecting the opening of said warning device actuating circuit, and the said return operation of a coupling relay effecting the unlatching of said latching relay and the consequent setting up of the warning device actuating circuit through said unlatched position of said latching relay, whereby said warning device will be actuated upon a subsequent closing of a fault switch.

2. In a multiple indicator system: a plurality of electrical indicators having individual indicator functions; a plurality of corresponding indicator actuator circuits including a common power lead for connecting the respecttive indicators in parallel to a source of current, and each including a fault switch and a control connection therefrom to a respective indicator; an electrical warning device; a circuit for actuating said device; a double throw latching relay having an unlatched position in which it establishes a connection in said actuating circuit; said relay including means for latching the same in a latched position; and including electromagnetic means for releasing said latching means; a circuit for energizing said relay to shift the same to a latched position; a reset switch for controlling said energizing circuit; a plurality of double-throw coupling relays, one for each of said indicators and each having a self-closing position in which it constitutes a connection in said warning device actuating circuit; an unlatching circuit for energizing said electromagnetic releasing means, including a connection through the latching relay in the latched position thereof and parallel connections through the self-closing positions of the respective coupling relays to the respective fault switch control connections; and a reversing circuit for each of said coupling relays, including a common connection to the latching relay in its said latched position and a common connection to said reset switch, whereby the closing of said reset switch will operate to shift said latching relay to its latched position and to then shift the coupling relays to reversed positions; each coupling relay having a holding circuit which is closed by a connection to a respective fault switch established through its alternate contact in said reversed position, and which maintains the respective coupling relay in its reversed position until the respective fault switch is opened, whereupon the respective coupling relay will return to its self-closing position; the reversing of the respective coupling switch effecting the opening of said warning device actuating circuit, and the said return operation of a coupling relay effecting the unlatching of said latching relay and the consequent setting up of the warning device actuating circuit through said unlatched position of said latching relay, whereby said warning device will be actuated upon a subsequent closing of a fault switch.

3. In a multiple indicator system: a plurality of electrical indicators having individual indicator functions; a plurality of corresponding indicator actuator circuits including a common power lead for connecting the respective indicators in parallel to a source of current, and each including a fault switch and a control connection therefrom to a respective indicator; an electrical warning device; a circuit for actuating said device; a double throw holding relay having a self-closing normal position in which it establishes a connection in said actuating circuit and a reversed position for deactivating said device; said relay including means for holding the same in said reversed position, having a pair of contacts on which it closes in said reversed position and including means for returning it to said normal position; a circuit for energizing said relay to shift the same to the reversed position; a reset switch for controlling said energizing circuit; a plurality of double-throw coupling relays, one for each of said indicators and each having a self-closing position in which it constitutes a connection in said warning device actuating circuit; a circuit for energizing said returning means, including a connection through one of said pair of contacts of the holding relay and parallel connections through the self-closing positions of the respective coupling relays to the respective fault switch control connections; and a reversing circuit for each of said coupling relays, including a common connection to the other of said pair of contacts of the holding relay and a common connection to said reset switch, whereby the closing of said reset switch will operate to shift a coupling relay to a reversed position while substantially simultaneously shifting said holding relay to its reversed position; each coupling relay having a holding circuit which is closed by a connection to a respective fault switch established through its alternate contact in said reversed position, and which maintains the respective coupling relay in its reversed position until the respective fault switch is opened, whereupon the respective coupling relay will return to its self-closing position; the reversing of the respective coupling switch effecting the opening of said warning device actuating circuit, and the said return operation of said coupling relay effecting the returning operation of said holding relay and the consequent setting up of the warning device actuating circuit through said normal position of said holding relay, whereby said warning device will be actuated upon a subsequent closing of a fault switch.

4. In a multiple indicator system: a plurality of electrical indicators having individual indicator functions; a plurality of corresponding indicator actuator circuits including a common power lead for connecting the respective indicators in parallel to a source of current, and each including a fault switch and a control connection therefrom to a respective indicator for energizing the latter upon closing of its fault switch; an electrical warning device; a circuit for actuating said device; a double throw holding relay having a normal position in which it establishes a connection in said actuating circuit and a reversed position for deactivating said device, said relay including means for holding the same in said reversed position and including means for returning it to said normal position; a circuit for energizing said relay to shift the same to said reversed position; a reset switch for controlling said energizing circuit; a plurality of remote control circuits, one for each of said indicators and each including a control device for controlling said returning means, including a connection to a respective fault switch control connection and a common connection to said relay and a common connection to said reset switch, whereby the closing of said reset switch will operate to shift said relay to said reversed position while simultaneously shifting the remote control device of the energized indicator to a condition in which it is inoperative for effecting said returning operation.

5. In a multiple indicator system: a plurality of electrical indicators having individual indicator functions; a plurality of corresponding indicator actuator circuits including a common power lead for connecting the respective indicators in parallel to a source of current, and each including a fault switch and a control connection therefrom to a respective indicator for energizing the same upon closing of its fault switch; an electrical warning device; a circuit for actuating said device, said actuating circuit including connections to the respective fault switches such that the warning device will be actuated simultaneously with the energizing of an indicator; a double throw holding relay having a normal position in which it establishes a connection in said actuating circuit and a reversed position for deactivating said warning device, said relay including means for holding the same in said reversed position and including electrically operated means for returning it to said normal position; a circuit including a reset switch for effecting shift of said relay to said reversed position; a plurality of remote control circuits each including a control device and connections to said relay, to said reset switch, and to a respective fault switch control connection such that the closing of said reset switch will operate to shift said relay to said reversed position so as to deactivate said warning device while simultaneously shifting the remote control device of the energized indicator to a condition in which it is ineffective for the actuation of said returning means, the opening of said reset switch will leave the relay in said reversed condition while preparing it for return to its normal position and will leave a remote control device of an open indicator circuit set in a position for subsequent actuation of said returning means, and the subsequent closing of a fault switch will effect such actuation of the returning means, whereby to energize the indicator of that fault switch and simultaneously energize said warning device.

6. In a multiple indicator system: a plurality of electrical indicators having individual indicator functions; a plurality of corresponding indicator actuator circuits including a common power lead for connecting the respective indicators in parallel to a source of current, and each including a fault switch and a control connection therefrom to a respective indicator for energizing the same upon closing of its fault switch; an electrical warning device; a circuit for actuating said device, said actuating circuit including connections to the respective fault switches such that the warning device will be actuated simultaneously with the energizing of any one indicator; a double throw holding relay having a normal position in which it establishes a connection in said actuating circuit for assisting in the actuation of said warning device and having a reversed position for deactivating said warning device, said relay including means automatically operable upon attainment of said reversed position, for holding the relay in said reversed position, and including electrically operated means for returning it to said normal position; a circuit including a manually operable reset switch for effecting shift of said relay to said reversed position; a plurality of remote control circuits each including a control device and connections to said relay, to said reset switch, and to a respective fault switch control connection such that the closing of said reset switch will operate to shift said relay to said reversed position so as to deactivate said warning device while leaving said energized indicator in an indicating condition and simultaneously shifting the remote control device of the energized indicator to a condition in which it is ineffective for the actuation of said returning means, whereas the opening of said reset switch will leave the relay in said reversed condition and will leave a remote control device of an open indicator circuit set in a position for subsequent actuation of said returning means to reestablish the relay as a connection in the indicator energizing circuits, and the subsequent closing of a fault switch will effect such actuation of the returning means while simultaneously energizing the warning device and the indicator of the fault switch just closed.

No references cited.